United States Patent
Mukherjee et al.

(10) Patent No.: US 8,848,882 B2
(45) Date of Patent: Sep. 30, 2014

(54) SYSTEM FOR AND METHOD OF MEASURING CALLER INTERACTIONS DURING A CALL SESSION

(75) Inventors: Sumit Kumar Mukherjee, Chennai (IN); Vishal Bhasin, Haryana (IN); Prateek Mehrotra, Uttar Pradesh (IN); Kannan Venugopal, Tamil Nadu (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 372 days.

(21) Appl. No.: 12/831,493

(22) Filed: Jul. 7, 2010

(65) Prior Publication Data

US 2012/0008754 A1  Jan. 12, 2012

(51) Int. Cl.
- *H04M 1/64* (2006.01)
- *H04M 3/493* (2006.01)
- *H04M 3/22* (2006.01)
- *G10L 15/22* (2006.01)
- *H04B 1/38* (2006.01)
- *H04M 3/51* (2006.01)

(52) U.S. Cl.
CPC .......... *G10L 15/22* (2013.01); *H04M 2203/556* (2013.01); *H04M 2203/551* (2013.01); *H04M 3/493* (2013.01); *H04M 3/2281* (2013.01); *H04M 3/5175* (2013.01)
USPC ........................................ 379/88.18; 455/563

(58) Field of Classification Search
CPC .......... H04M 3/493; H04M 2203/551; H04M 2203/556; H04M 3/2281; H04M 3/5175; G06F 9/44; G10L 15/22
USPC ............................................ 379/88.01–88.19
See application file for complete search history.

(56) References Cited

U.S. PATENT DOCUMENTS

| | | | |
|---|---|---|---|
| 2004/0032933 A1* | 2/2004 | Groves et al. | 379/88.01 |
| 2005/0131684 A1* | 6/2005 | Clelland et al. | 704/231 |
| 2006/0126803 A1* | 6/2006 | Patel et al. | 379/88.01 |
| 2007/0133759 A1* | 6/2007 | Malik et al. | 379/80 |
| 2009/0141871 A1* | 6/2009 | Horioka et al. | 379/88.04 |
| 2010/0166158 A1* | 7/2010 | Costello et al. | 379/88.04 |
| 2010/0220842 A1* | 9/2010 | Thenthiruperai | 379/88.04 |

\* cited by examiner

*Primary Examiner* — Fan Tsang
*Assistant Examiner* — Solomon Bezuayehu (57) ABSTRACT

A system for and method of monitoring caller interactions during a call session is presented. The system and method for monitoring caller interaction may include receiving information from a call session between a caller and an automated voice portal system via a communication network, monitoring caller interaction points accumulated during the call session, comparing a sum of caller interaction points accumulated during the call session with the automated voice portal system with the caller interaction threshold, and taking one or more actions in response to the sum of the caller interaction points exceeds the caller interaction threshold.

31 Claims, 4 Drawing Sheets

SYSTEM FOR AND METHOD OF MEASURING CALLER INTERACTIONS DURING A CALL SESSION

BACKGROUND INFORMATION

Today voice portals are becoming a popular platform for automating inbound and outbound voice customer cares by various companies across industries. Voice portals play a vital role in providing customers with automated self service information and transfer customers to service agents when necessary. However, the current automated voice portals are ill-equipped to measure caller interaction during a call session.

BRIEF DESCRIPTION OF THE DRAWING

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

An exemplary embodiment provides a system and a process for measuring a caller interactions during a call session. For example, a caller interaction measurement system may monitor caller interactions with an automated voice portal for the duration of a call session. The caller interaction measurement system may monitor the caller interaction based at least in part on various parameters. The various parameters that the caller interaction measurement system may monitor includes at least one of misrecognitions by the automated voice portal system, caller's tone/pitch, language used, previous call sessions, or other parameters associated with caller interactions. During a call session, the caller interaction measurement system may monitor various parameters associated with the call session to determine whether to transfer the caller to a live agent.

In an exemplary embodiment, the caller interaction measurement system may monitor caller interactions in real-time during a call session. For example, the caller interaction measurement system may assign caller interactions points to various parameters of a call session. The caller interaction measurement system may monitor total number of caller interaction points during a call session. The caller interaction measurement system may determine caller interaction threshold of a caller based at least in part on a previous call session. The caller interaction measurement system may compare the total number of caller interaction points with the caller interaction threshold. The caller interaction measurement system may determine whether to transfer the caller to a live agent based at least in part on the comparison of the total number of caller interaction points with the caller interaction threshold.

Figure 1:
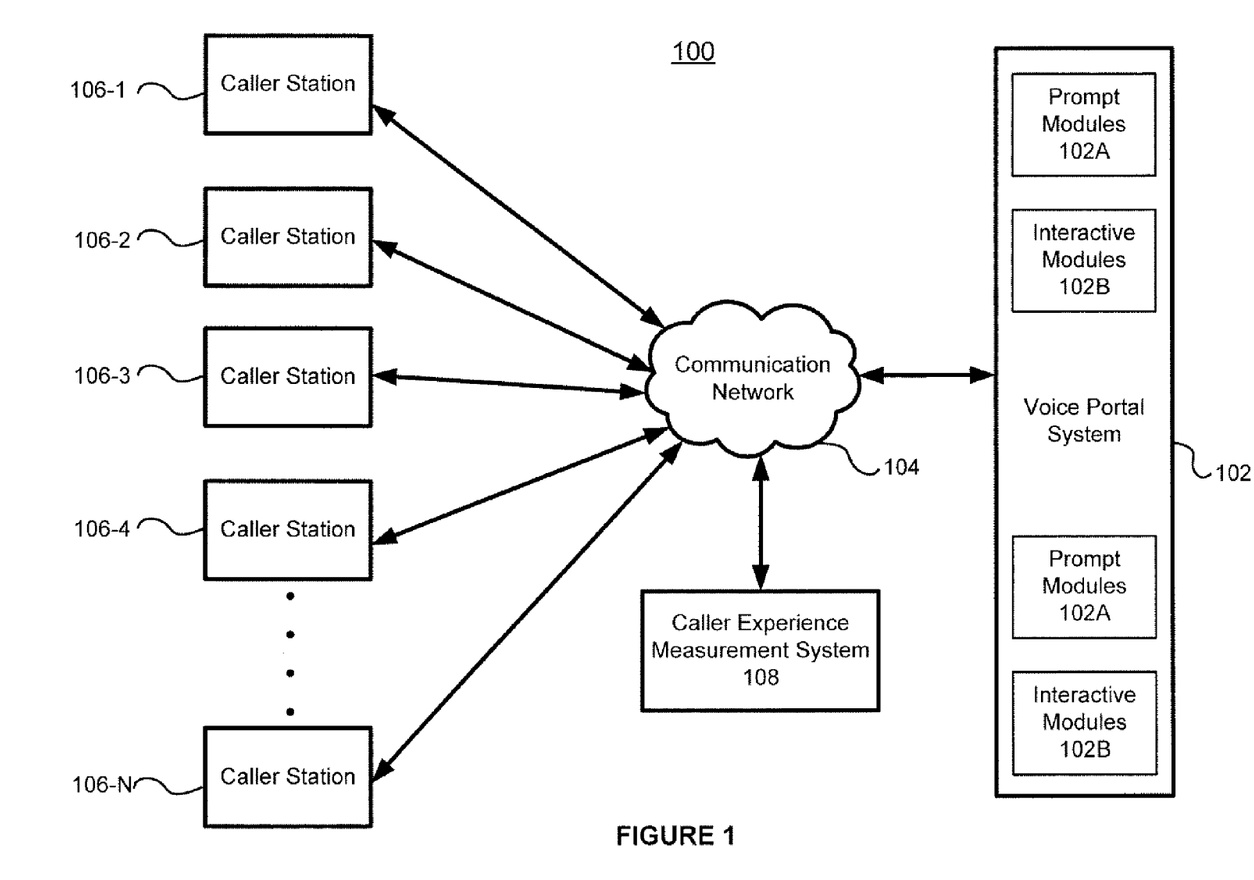
FIG. 1 is a schematic diagram illustrating a caller monitoring system according to a particular embodiment.

FIG. 1 is a schematic diagram illustrating a caller monitoring system according to particular embodiments. As illustrated in FIG. 1, the caller monitoring system 100 may include an automated voice portal system 102 comprising a plurality of prompt modules 102a and interactive modules 102b coupled to a plurality of caller stations 106(1-N) via a communication network 104. The caller monitoring system 100 may also comprise a caller interaction measurement system 108 coupled to the automated voice portal system 102 and the plurality of caller stations 106(1-N) via the communication network 104. In an exemplary embodiment, a caller associated with one of the plurality of caller stations 106(1-N) may establish a call session with the automated voice portal system 102 via the communication network 104. During the call session, the caller interaction measurement system 108 may monitor a caller interaction (e.g., agitation, frustration, or anger) in real-time between the caller and the automated voice portal system 102 based at least in part on various parameters. The caller interaction measurement system 108 may determine whether to transfer the caller to a live agent during the call session based at least in part on the various parameters associated with the caller interaction.

The automated voice portal system 102 may include a plurality of prompt modules 102a. Each prompt module 102a may provide different information to a caller during a call session. For example, the plurality of prompt modules 102a may provide the caller with information without requesting a response from the caller. In an exemplary embodiment, the prompt modules 102a may provide callers with information based at least in part on a caller profile or a caller response. In an exemplary embodiment, a prompt module 102a may play a personal "Welcome" greeting to a caller based at least in part on a caller profile. During a call session, a prompt module 102a may play "Welcome John Doe to the automated Voice Portal System," when a caller named John Doe establishes the call session with the automated voice portal system 102. In another exemplary embodiment, the prompt modules 102a may provide a "statement balance" to a caller based at least in part on a caller response. For example, a prompt module 102a may provide a "statement balance" based at least in part on a caller response requesting the "statement balance."

The automated voice portal system 102 may include a plurality of interactive modules 102b. For example, the plurality of interactive modules 102b may require a unit of interaction between the caller and the automated voice portal system 102 during a call session. In an exemplary embodiment, the unit of interaction may comprise an interactive module 102b presenting a question to a caller and receive a response to the question from the caller during a call session. For example, the plurality of interactive modules 102b may include a predetermined set of grammars associated with a question presented to a caller. The predetermined set of grammars may include one or more acceptable responses to a question presented to a caller. In an exemplary embodiment, the interactive modules 102b may receive a response (e.g., verbal speech) to a question. The interactive modules 102b may match the received response (e.g., verbal speech) to a predetermined set of grammars associated with a question. In the event that the received response matches the predetermined set of grammars, the automated voice portal system 102 may perform one or more actions based at least in part on the received response.

In an exemplary embodiment, an interactive module 102b may present a caller a selection question (e.g., select from one of the options "billing," "ordering,", and "tech support."). The predetermined set of grammars associated with the selection question may include billing, bill, statement, monthly statement, charges, order, new service, new product, tech support, technical support, technical assistance, or other acceptable responses associated with the selection question. A caller may provide a response to the selection question. The interactive module 102b may attempt to match the response provided by the caller to the predetermined set of grammars associated with the selection question. In the event that the response provided by the caller matches the predetermined set of grammars (e.g., "billing"), the interactive module 102b may execute one or more actions associated with the "billing" option. In the event that the response provided by the caller does not match the predetermined set of grammars, the interactive module 102b may perform one or more predetermined actions (e.g., repeat the question, propose an acceptable response, or transfer to a live agent).

The automated voice portal system 102 may include one or more servers. For example, the automated voice portal system 102 may include a UNIX based server, Windows 2000 Server, Microsoft IIS server, Apache HTTP server, API server, Java server, Java Servlet API server, ASP server, PHP server, HTTP server, Mac OS X server, Oracle server, IP server, or other independent server to establish a call session with a plurality of caller station 106(1-N) via the communication network 104. Also, the automated voice portal system 102 may include one or more Internet Protocol (IP) network server or public switch telephone network (PSTN) server. The automated voice portal system 102 may simultaneously establish a plurality of call sessions with a plurality of caller stations 106(1-N) via the communication network 104.

The automated voice portal system 102 may include one or more storage devices including, without limitation, paper card storage, punched card, tape storage, paper tape, magnetic tape, disk storage, gramophone record, floppy disk, hard disk, ZIP disk, holographic, molecular memory. The one or more storage devices may also include, without limitation, optical disc, CD-ROM, CD-R, CD-RW, DVD, DVD-R, DVD-RW, DVD+R, DVD+RW, DVD-RAM, Blu-ray, Minidisc, HVD and Phase-change Dual storage device. The one or more storage devices may further include, without limitation, magnetic bubble memory, magnetic drum, core memory, core rope memory, thin film memory, twistor memory, flash memory, memory card, semiconductor memory, solid state semiconductor memory or any other like mobile storage devices.

The communication network 104 may be coupled to the automated voice portal system 102, the plurality of caller stations 106(1-N), and the caller interaction measurement system 108. The communication network 104 may be a wireless network, a wired network or any combination of wireless network and wired network. For example, the communication network 104 may include one or more of a fiber optics network, a passive optical network, a cable network, an Internet network, a satellite network (e.g., operating in Band C, Band Ku or Band Ka), a wireless LAN, a Global System for Mobile Communication (GSM), a Personal Communication Service (PCS), a Personal Area Network (PAN), D-AMPS, Wi-Fi, Fixed Wireless Data, IEEE 802.11a, 802.11b, 802.15.1, 802.11n and 802.11g or any other wired or wireless network for transmitting and receiving a data signal. In addition, the communication network 104 may include, without limitation, telephone line, fiber optics, IEEE Ethernet 802.3, wide area network (WAN), local area network (LAN), or global network such as the Internet. The communication network 104 may support an Internet network, a wireless communication network, a cellular network, or the like, or any combination thereof.

The communication network 104 may further include one, or any number of the exemplary types of networks mentioned above operating as a stand-alone network or in cooperation with each other. Although the communication network 104 is depicted as one network, it should be appreciated that according to one or more embodiments, the communication network 104 may comprise a plurality of interconnected networks, such as, for example, a service provider network, the Internet, a broadcaster's network, a cable television network, corporate networks, and home networks.

The plurality of caller stations 106(1-N) may be a phone, a cellular communication device, a wireless telephone, a mobile device, a computer, a personal computer, a laptop, a workstation, a handheld PC, a personal digital assistant (PDA), a thin system, a fat system, a network appliance, an Internet browser, or other any other device that may establish a call session with the automated voice portal system 102 via the communication network 104.

The caller interaction measurement system 108 may include one or more servers. For example, the caller interaction measurement system 108 may include a UNIX based server, Windows 2000 Server, Microsoft IIS server, Apache HTTP server, API server, Java server, Java Servlet API server, ASP server, PHP server, HTTP server, Mac OS X server, Oracle server, IP server, or other independent server to monitor caller interactions between a caller and the automated voice portal system 102 in real-time during a call session. Also, the caller interaction measurement system 108 may include one or more Internet Protocol (IP) network server or public switch telephone network (PSTN) server. The caller interaction measurement system 108 may monitor caller interactions with the automated voice portal system 102 during a plurality of call sessions with a plurality of caller stations 106(1-N) via the communication network 104.

The caller interaction measurement system 108 may include one or more storage devices including, without limitation, paper card storage, punched card, tape storage, paper tape, magnetic tape, disk storage, gramophone record, floppy disk, hard disk, ZIP disk, holographic, molecular memory. The one or more storage devices may also include, without limitation, optical disc, CD-ROM, CD-R, CD-RW, DVD, DVD-R, DVD-RW, DVD+R, DVD+RW, DVD-RAM, Blu-ray, Minidisc, HVD and Phase-change Dual storage device. The one or more storage devices may further include, without limitation, magnetic bubble memory, magnetic drum, core memory, core rope memory, thin film memory, twistor memory, flash memory, memory card, semiconductor memory, solid state semiconductor memory or any other like mobile storage devices.

Figure 2:
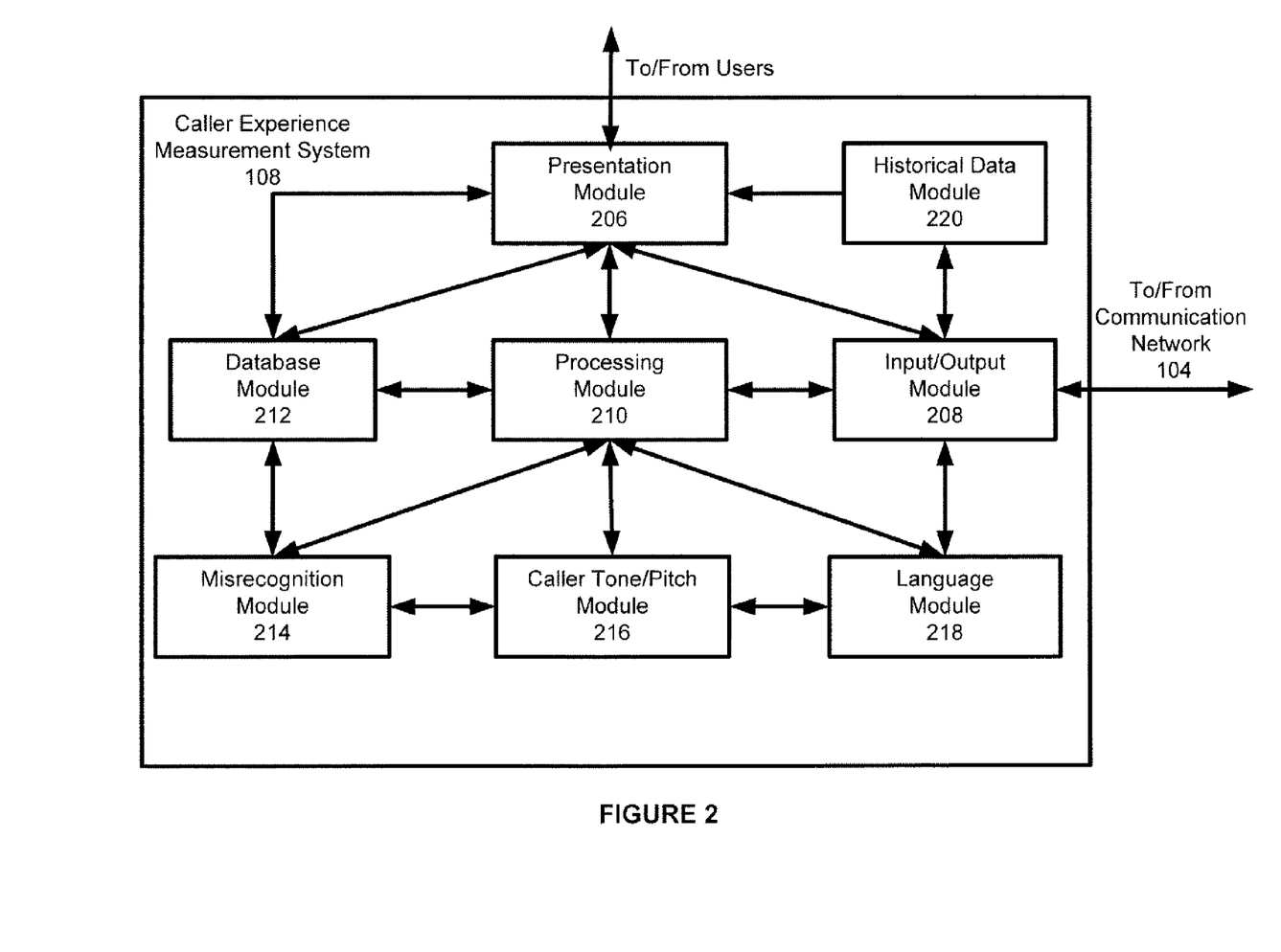
FIG. 2 is a block diagram of a hardware component of the caller interaction measurement system of a particular embodiment.

FIG. 2 is a block diagram of a hardware component of the caller interaction measurement system 108 of a particular embodiment. The caller interaction measurement system 108 may include a presentation module 206, an input module 208, a processing module 210, a database module 212, a misrecognition module 214, a caller tone/pitch module 216, a language module 218 or a historical data module 220. It is noted that the modules 206, 208, 210, 212, 214, 216, 218, and 220 are exemplary and the functions performed by one or more of the modules may be combined with that performed by other modules. The functions described herein as being performed by the modules 206, 208, 210, 212, 214, 216, 218, and 220 also may be separated and may be located or performed by other modules. Moreover, the modules 206, 208, 210, 212, 214, 216, 218, and 220 may be implemented at other devices of the caller monitoring system 100 (e.g., the plurality of caller stations 106(1-N) or the automated voice portal system 102).

The presentation module 206 may provide an interface between the caller interaction measurement system 108 and a user (e.g., administrator) associated with the caller interaction measurement system 108. The presentation module 206 may include a user interface, e.g., a graphical user interface, an application programming interface (API) to interact with the users associated with the caller interaction measurement system 108. The presentation module 206 may receive one or more queries or requests from a user and to provide the received queries or requests to other modules of the caller interaction measurement system 108. The presentation module 206 may provide queries or requests to the processing module 210, wherein the queries or requests may determine an operation of various modules of the caller interaction measurement system 108. In response to receiving a query or request from a user, the presentation module 206 may provide the queries or requests (e.g., control signals, etc.) to the input module 208, the processing module 210, the database module 212, the misrecognition module 214, the caller tone/pitch module 216, the language module 218, and the historical data module 220. In an exemplary embodiment, the user may request that the caller interaction measurement system 108 to monitor caller interactions between a caller and the automated voice portal system 102 in real-time during a call session.

The presentation module 206 may present information or data to the user via a display associated with the caller interaction measurement system 108. The presentation module 206 may display upon a user's query or request, or the presentation module 206 may automatically display information or data to the user. In an exemplary embodiment, the presentation module 206 may provide information or data associated with caller interactions with the automated voice portal system 102 during a call session. For example, the presentation module 206 may provide information or data to inform the user that the caller's interaction (e.g., increasing in agitation or frustration) with the automated voice portal system 102 during a call session. In another exemplary embodiment, the presentation module 206 may provide information or data of various parameters associated with caller interactions with the automated voice portal system 102 in real-time during a call session. For example, the presentation module 206 may provide a message to inform the user a number of misrecognitions by the automated voice portal system 102 during a call session. The presentation module 206 may provide a message to inform the user that a caller raises tone or pitch (e.g., measured by decibels (dB)). The presentation module 206 may provide a message to inform the user that a caller uses derogatory or critical languages. In other exemplary embodiments, the presentation module 206 may provide information or data to solicit a response from the user. For example, the presentation module 206 may solicit a response from the user to determine whether to transfer a caller to a live agent during a call session.

In another exemplary embodiment, the presentation module 206 may include manual inputs having one or more keyboards, receiver, video camera, speaker phone, and/or key pad for inputting information. Also, the presentation module 206 may include a DTMF signal generator having DTMF keys to generate numerical signals and text signals. In an exemplary embodiment, a user associated with the caller interaction measurement system 108 may input one or more queries or requests. In an other exemplary embodiment, the user associated with the caller interaction measurement system 108 may input a voice command or a video command via the presentation module 206 to generate one or more queries or commands.

The input module 208 may include one or more interfaces for receiving information or data in real-time associated with a call session. For example, the input module 208 may include a signaling system number #7 (SS7) interface, a session initiation protocol (SIP) interface, a public switch telephone network (PSTN) interface, a voice over Internet protocol (VoIP) interface, an Internet protocol multimedia subsystem (IMS) interface, an advanced intelligent network (AIN) interface or other interfaces for transmitting and receiving information or data in real-time from a call session via the communication network 104.

The input module 208 may preprocess (e.g., filter, sort, format, and aggregate) the information or data of a call session before transferring the information or data to the processing module 210. In an exemplary embodiment, the preprocessing of the information or data of a call session performed by the input module 208 may include filtering the information of a call session and eliminating erroneous or defective (e.g., inaudible speech, background noise) information of a call session. Also, the input module 208 may sort the information of a call session in a sequential order, converting the messages into desired format (e.g., convert analog signals to digital signals), and formatting the information of a call session for transmission (e.g., format the information of a call session according to desired protocols for transmission).

The misrecognition module 214 may monitor a rate of misrecognitions by the automated voice portal system 102. In an exemplary embodiment, a misrecognition by the automated voice portal system 102 may require a caller to repeat a response and as the rate of misrecognition increases during a call session the caller may become agitated or frustrated with the call session. The misrecognition module 214 may calculate and record a rate of misrecognition associated with the plurality of interactive modules 102b of the automated voice portal system 102. For example, the misrecognition module 214 may calculate an average rate of misrecognition associated with an interactive module 102b by dividing a number of misrecognition associated with an interactive module 102b by a total number of calls accessing the interactive module 102b. The misrecognition module 214 may categorize the plurality of interactive modules 102b of the automated voice portal system 102 based at least in part on a rate of misrecognition associated with each interactive module 102b. The misrecognition module 214 may categorize the plurality of interactive modules 102b into one or more groups. In an exemplary embodiment, the misrecognition module 214 may categorize an interactive module 102b into a default group. The misrecognition module 214 may modify the categorization of the plurality of interactive modules 102b based at least in part on a variation in a rate of misrecognition associated with each of the plurality of interactive modules 102b.

In an exemplary embodiment, the misrecognition module 214 may categorize the plurality of interactive modules 102b into three groups. For example, the misrecognition module 214 may categorize the plurality of interactive modules 102b into an easy group, a moderate group, and a difficult group. In an exemplary embodiment, the easy group of interactive modules 102b may include one or more interactive modules 102b having a high rate of recognition (e.g., or low rate of misrecognition) of responses provided by the caller. The easy group of interactive modules 102b may require responses from a caller that may be easily matched with a predetermined set of grammars associated with the one or more interactive modules 102b. For example, the easy group of interactive modules 102b may include one or more interactive modules 102b that may have a rate of recognition in a predetermined range. In an exemplary embodiment, the easy group of interactive modules 102b may include one or more interactive modules 102b that may have a rate of recognition in a range between 67%-100%. In another exemplary embodiment, the easy group of interactive modules 102b may include one or more interactive module 102b that may require a simple answer (e.g., 1-5 syllables) that may be easily matched to a predetermined set of grammars. For example, the easy group of interactive modules 102b may include one or more interactive modules 102b that may require yes, no, 0, 1, 2, 3, 4, 5, 6, 7, 8, 9 answers.

In another exemplary embodiment, the moderate group of interactive modules 102b may include one or more interactive modules 102b having a moderate or fair rate of recognition of responses provided by the caller. The moderate group of interactive modules 102b may require responses from a caller that may be moderately matched with a predetermined set of grammars associated with the one or more interactive modules 102b. For example, the moderate group of interactive modules 102b may include one or more interactive modules 102b that may have a rate of recognition in a predetermined range. In an exemplary embodiment, the moderate group of interactive modules 102b may include one or more interactive modules 102b that may have a rate of recognition in a range between 34%-66%. In another exemplary embodiment, the moderate group of interactive modules 102b may include one or more interactive modules 102b that may require a moderate answer (e.g., 6-10 syllables) that may be moderately matched to a predetermined set of grammars. For example, the moderate group of interactive modules 102b may include one or more interactive modules 102b that may require "billing," "payment," "order," or "technical assistance" answers.

In other exemplary embodiments, the difficult group of interactive modules 102b may include one or more interactive modules 102b having low rate of recognition of responses provided by the caller. The difficult group of interactive modules 102b may require responses from a caller that may be difficult to match with a predetermined set of grammars associated with the one or more interactive modules 102b. For example, the difficult group of interactive modules 102b may include one or more interactive modules 102b that may have a rate of recognition in a predetermined range. In an exemplary embodiment, the difficult group of interactive modules 102b may include one or more interactive modules 102b that may have a rate of recognition in a range between 0%-33%. In another exemplary embodiment, the difficult group of interactive modules 102b may include one or more interactive modules 102b that may require a difficult answer (e.g., 15-25 syllables) that may be difficult to match to a predetermined set of grammars. For example, the difficult group of interactive modules 102b may include one or more interactive modules 102b that may require "last Monday," "an hour ago," or "$23^{rd}$ of February" answers.

The misrecognition module 214 may determine caller interactions with the automated voice portal system 102 based at least in part on a rate of misrecognition by the interactive modules 102b. For example, the misrecognition module 214 may assign caller interaction points associated with each group of interactive modules 102b. In an exemplary embodiment, the misrecognition module 214 may assign a large number of positive caller interaction points (e.g., x/2, where x denotes a unit of frustration) for a misrecognition associated with the easy group of interactive modules 102b. The misrecognition module 214 may assign a medium number of positive caller interaction points (e.g., x/4, where x denotes a unit of frustration) for a misrecognition associated with the moderate group of interactive modules 102b. The misrecognition module 214 may assign a small number of positive caller interaction points (e.g., x/6, where x denotes a unit of frustration) for a misrecognition associated with the difficult group of interactive modules 102b. For example, the large number of positive caller interaction points assigned for a misrecognition associated with the easy group of interactive modules 102b may represent that callers are not used to misrecognition with the easy group of interactive modules 102b. In contrast, the small number of positive caller interaction points assigned for a misrecognition associated with the difficult group of interactive modules 102b may represent that callers are used to misrecognition with the difficult group of interactive modules 102b.

The misrecognition module 214 may monitor a number of misrecognitions associated with each of the plurality of interactive modules 102b during a call session. For example, the misrecognition module 214 may record and store a number of misrecognitions associated with each of the plurality of interactive modules 102b during a call session. In an exemplary embodiment, the misrecognition module 214 may record a number of misrecognitions associated with the easy group of interactive modules 102b, a number of misrecognitions associated with the moderate group of interactive modules 102b, a number of misrecognitions associated with the difficult group of interactive modules 102b during a call session. The misrecognition module 214 may record and store a number of positive caller interaction points associated with misrecognition during a call session. In an exemplary embodiment, the misrecognition module 214 may record a number of positive caller interaction points for misrecognition associated with the easy group of interactive modules 102b, a number of positive caller interaction points for misrecognition associated with the moderate group of interactive modules 102b, a number of positive caller interaction points for misrecognition associated with the difficult group of interactive modules 102 during a call session.

In another exemplary embodiment, the misrecognition module 214 may determine caller interaction with the automated voice portal system 102 based at least in part on good recognitions by the interactive modules 102b. For example, the misrecognition module 214 may assign negative caller interaction points associated with good recognition of each group of interactive modules 102b. In an exemplary embodiment, the misrecognition module 214 may assign a small number of negative caller interaction points (e.g., -x/6, where x denotes a unit of frustration) for a good recognition associated with the easy group of interactive modules 102b. The misrecognition module 214 may assign a medium number of negative caller interaction points (e.g., -x/4, where x denotes a unit of frustration) for a good recognition associated with the moderate group of interactive modules 102b. The misrecognition module 214 may assign a large number of negative caller interaction points (e.g., -x/2, where x denotes a unit of frustration) for a good recognition associated with the difficult group of interactive modules 102b. For example, the large number of negative caller interaction points assigned for a good recognition associated with the difficult group of interactive modules 102b may represent that callers are not used to good recognition with the difficult group of interactive modules 102b. In contrast, the small number of negative caller interaction points assigned for a good recognition associated with the easy group of interactive modules 102b may represent that callers are used to good recognition with the easy group of interactive modules 102b.

The misrecognition module 214 may monitor a number of good recognitions associated with each of the plurality of interactive modules 102b during a call session. For example, the misrecognition module 214 may record and store a number of good recognitions associated with each of the plurality of interactive modules 102b during a call session. In an exemplary embodiment, the misrecognition module 214 may record a number of good recognitions associated with the easy group of interactive modules 102b, a number of good recognitions associated with the moderate group of interactive modules 102b, a number of good recognitions associated with the difficult group of interactive modules 102b during a call session. The misrecognition module 214 may record and store a number of negative caller interaction points associated with good recognition during a call session. In an exemplary embodiment, the misrecognition module 214 may record a number of negative caller interaction points for good recognition associated with the easy group of interactive modules 102b, a number of negative caller interaction points for good recognition associated with the moderate group of interactive modules 102b, a number of negative caller interaction points for good recognition associated with the difficult group of interactive modules 102b during a call session.

In other exemplary embodiments, the misrecognition module 214 may monitor a number of consecutive misrecognitions during a call session. For example, the misrecognition module 214 may monitor a number of consecutive misrecognitions for a combination of the easy group of interactive modules 102b, the moderate group of interactive modules 102b, and the difficult group of interactive modules 102b. In another exemplary embodiment, the misrecognition module 214 may monitor a number of consecutive misrecognitions for the easy group of interactive modules 102b. The misrecognition module 214 may monitor a number of consecutive misrecognitions for the moderate group of interactive modules 102b. The misrecognition module 214 may monitor a number of consecutive misrecognitions for the difficult group of interactive modules 102b.

The caller tone/pitch module 216 may monitor speech of a caller during a call session to determine caller interactions with the automated voice portal system 102. For example, the caller tone/pitch module 216 may monitor tone, pitch, loudness, or other characteristics associated with a speech of a caller during a call session. The caller tone/pitch module 216 may include a voice analyzer, a voice stress analyzer, decibel meter, or other speech analyzers. In an exemplary embodiment, a caller may become agitated or frustrated with the automated voice portal system 102 and may vary a speech pattern (e.g. raising voice) during a call session. The caller tone/pitch module 216 may monitor the variation in speech pattern of a caller during a call session to determine caller interactions with the automated voice portal system 102.

In an exemplary embodiment, the caller tone/pitch module 216 may monitor a change in the volume (e.g., in decibel (dB)) of a caller's speech during a call session. The caller tone/pitch module 216 may categorize a level of change in the volume of a caller's speech during a call session. The caller tone/pitch module 216 may categorize the level of change in volume of a caller's speech during a call session in a plurality of predetermined range of decibels (dBs). In an exemplary embodiment, the caller tone/pitch module 216 may categorize a first level as a change between 0-2 decibels (dBs) in the volume of a caller's speech during a call session. The caller tone/pitch module 216 may categorize a second level as a change between 3-5 decibels (dBs) in the volume of a caller's speech during a call session. The caller tone/pitch module 216 may categorize a third level as a change above 5 decibels (dBs) in the volume of a caller's speech during a call session.

The caller tone/pitch module 216 may assign a number of caller interaction points to each level of change in the volume of a caller's speech during a call session. In an exemplary embodiment, the caller tone/pitch module 216 may assign a small number of positive caller interaction points (e.g., x/3, where x denotes one unit of frustration) to the first level of change in the volume of a caller's speech during a call session. The caller tone/pitch module 216 may assign a medium number of positive caller interaction points (e.g., x/2, wherein x denotes one unit of frustration) to the second level of change in the volume of a caller's speech during a call session. The caller tone/pitch module 216 may assign a large number of positive caller interaction points (e.g., x, wherein x denotes one unit of frustration) to the third level of change in the volume of a caller's speech during a call session.

For example, the caller tone/pitch module 216 may record and store a number of changes in the volume of a caller's speech during a call session. In an exemplary embodiment, the caller tone/pitch module 216 may record a number of times the volume of a caller's speech change to first level, a number of times the volume of a caller's speech change to second level, a number of times the volume of a caller's speech change to third level during a call session. The caller tone/pitch module 216 may record and store a number of caller interaction points associated with a caller changing the volume of speech during a call session. In an exemplary embodiment, the caller tone/pitch module 216 may record a number of caller interaction points for changes in the volume of a caller's speech to the first level, a number of caller interaction points for changes in the volume of a caller's speech to the second level, a number of caller interaction points for changes in the volume of a caller's speech to the third level during a call session.

In other exemplary embodiments, the caller tone/pitch module 216 may monitor a number of consecutive level changes in the volume of a caller's speech during a call session. For example, the caller tone/pitch module 216 may monitor a number of consecutive changes in the volume of a caller's speech for a combination of the first level, the second level, and the third level. In an exemplary embodiment, the caller tone/pitch module 216 may assign a number of positive caller interaction points (e.g., 2x, where x denotes a unit of frustration) for a consecutive level changes in the volume of a caller's speech during a call session. In another exemplary embodiment, the caller tone/pitch module 216 may monitor the number of caller interaction points for a consecutive level changes in the volume of a caller's speech during a call session.

The language module 218 may determine caller interactions with the automated voice portal system 102 based at least in part on language used by a caller during a call session. For example, a caller may become agitated or frustrated with the automated voice portal system 102 and may use derogatory language during a call session. The language module 218 may monitor and detect the derogatory language during a call session to determine call interactions with the automated voice portal system 102. In an exemplary embodiment, language module 218 may include a speech recognizer, speech analyzer, or other recognition devices to determine language used by a caller during a call session.

The language module 218 may include a predetermined set of grammars associated with the derogatory language. For example, the predetermined set of grammars of the language module 218 may include one or more acceptable responses associated with the derogatory language. The language module 218 may monitor and detect derogatory language used during a call session by matching responses of a caller to the predetermined set of grammars associated with the derogatory language. The language module 218 may match the response of a caller to the predetermined set of grammars with a confidence level. For example, the language module 218 may assign a number of caller interaction points associated with the confidence level of matching the response of a caller to the predetermined set of grammars associated with the derogatory language.

In an exemplary embodiment, the language module 218 may match a response to a predetermined set of grammars associated with derogatory language with a confidence level of greater than 70%. The language module 218 may assign a number of positive caller interaction points (e.g., 2x/3, where x denotes a unit of frustration) associated with the confidence level of greater than 70%. In another exemplary embodiment, the language module 218 may match a response to a predetermined set of grammars associated with derogatory language with a confidence level of 35%-70%. The language module 218 may assign a number of positive caller interaction points (e.g., x/3, wherein x denotes a unit of frustration) associated with the confidence level of 35%-70%. In other exemplary embodiments, the language module 218 may match a response to a predetermined set of grammar associated with derogatory language with a confidence level of 15%-34%. The language module 218 may assign a number of positive caller interaction points (e.g., x/6, wherein x denotes a unit of frustration) associated with the confidence level of 15%-34%.

In another exemplary embodiment, the language module 218 may assign difference number of caller interaction points with different derogatory language. For example, the language module 218 may assign a number of positive caller interaction points (e.g., 2x/3, where x denotes a unit of frustration) associated with derogatory language (e.g., f-word, s-word, or other derogatory words). The language module 218 may assign a number of positive caller interaction points (e.g., x/3, where x denotes a unit of frustration) associated with derogatory language (e.g., damn, bitch, or other derogatory languages). The language 218 may assign a number of positive caller interaction points (e.g., x/6, where x denotes a unit of frustration) associated with derogatory language (e.g., stupid, sucks, or other derogatory languages). The language module 218 may record and store a number of positive caller interaction points associated with a caller using derogatory language during a call session.

The historical data module 220 may include one or more databases to store previous caller interactions with the automated voice portal system 102. For example, the historical data module 220 may include caller profiles storing previous caller interactions with the automated voice portal system 102. The caller profiles may store a comfort level of a caller interacting with the automated voice portal system 102. The comfort level of a caller interacting with the automated voice portal system 102 may be determined based at least in part on information gather from the database module 212, the misrecognition module 214, the caller tone/pitch module 216, or the language module, 218.

The historical data module 220 may assign a caller interaction threshold associated with a caller. For example, the historical data module 220 may assign a caller interaction threshold to a previous caller based at least in part on the previous caller's comfort level with the automated voice portal system 102. In an exemplary embodiment, the historical data module 220 may assign a higher caller interaction threshold to a previous caller that may have a higher comfort level with the automated voice portal system 102. In another exemplary embodiment, the historical data module 220 may assign a lower caller interaction threshold to a previous caller that may have a lower comfort level with the automated voice portal system 102. The historical data module 220 may assign a default caller interaction threshold associated with a new caller based at least in part on one or more previous callers' comfort levels with the automated voice portal system 102. In an exemplary embodiment, the default caller interaction threshold associated with a new caller may be determined by calculating an average of the caller interaction threshold associated with the previous callers' comfort level with the automated voice portal system 102. In another exemplary embodiment, the default caller interaction threshold associated with a new caller may be same as a previous caller with similar caller profile as the new caller.

The historical data module 220 may update a caller interaction threshold based on one or more call sessions. For example, the historical data module 220 may lower a caller interaction threshold associated with a caller based on language (e.g., derogatory language) used during a call session with the automated voice portal system 102. In another exemplary embodiment, the historical data module 220 may raise a caller interaction threshold associated with a caller when the caller demonstrates patience. For example, the historical data module 220 may raise a caller interaction threshold when a caller provide multiple repeated responses after one or more misrecognition by the interactive modules 102*b*.

The historical data module 220 may assign caller interaction points (x) for one unit of frustration associated with a caller. For example, the historical data module 220 may assign caller interaction points (x) for one unit of frustration to a previous caller based at least in part on the previous caller's comfort level with the automated voice portal system 102. In an exemplary embodiment, the historical data module 220 may assign a lower caller interaction points (x) for one unit of frustration to a previous caller that may have a higher comfort level with the automated voice portal system 102. In another exemplary embodiment, the historical data module 220 may assign a higher caller interaction points (x) for one unit of frustration to a previous caller that may have a lower comfort level with the automated voice portal system 102. The historical data module 220 may assign a default or predetermined caller interaction points (x) for one unit of frustration associated with a new caller based at least in part on one or more previous callers' comfort levels with the automated voice portal system 102. In an exemplary embodiment, the default or predetermined caller interaction points (x) for one unit of frustration associated with a new caller may be determined by calculating an average of the caller interaction points (x) for one unit of frustration associated with the previous callers' comfort level with the automated voice portal system 102. In another exemplary embodiment, the default or predetermined caller interaction points (x) for one unit of frustration associated with a new caller may be same as a previous caller with similar caller profile as the new caller.

The historical data module 220 may update caller interaction points (x) for one unit of frustration based on one or more call sessions. For example, the historical data module 220 may raise caller interaction points (x) for one unit of frustration associated with a caller based on language (e.g., derogatory language) used during a call session with the automated voice portal system 102. In another exemplary embodiment, the historical data module 220 may lower caller interaction points (x) for one unit of frustration associated with a caller when the caller demonstrates patience. For example, the historical data module 220 may lower caller interaction points (x) for one unit of frustration when a caller provides multiple repeated responses after one or more misrecognition by the interactive modules 102*b*.

The processing module 210 may include one or more processors to control operations performed by the various modules of the caller interaction measurement system 108. The processing module 210 may be in communication with the presentation module 206, the input module 208, the database module 212, the misrecognition module 214, the caller tone/pitch module 216, the language module 218, and the historical data module 220. The processing module 210 may further include a plurality of sub-analytical modules to enable real-time monitoring caller interactions with the automated voice portal system 102 during a call session. In an exemplary embodiment, the processing module 210 may receive one or more queries or requests from users via the presentation module 206. For example, the processing module 210 may receive a request or query to monitor caller interactions with the automated voice portal system 102 during a call session.

The processing module 210 may determine caller interactions with the automated voice portal system 102 during a call session. In an exemplary embodiment, the processing module 210 may access the historical data module 220 to obtain a caller interaction threshold associated with a caller of a call session. In another exemplary embodiment, the processing module 210 may access the historical data module 220 to obtain a default caller interaction threshold associated with a new caller of a call session. The processing module 210 may access various modules to obtain a number of caller interaction points recorded and stored in each module. In an exemplary embodiment, the processing module 210 may access the misrecognition module 214 to obtain a number of caller interaction points associated with misrecognitions by the interactive modules 102b during a call session. In another exemplary embodiment, the processing module 210 may access the caller tone/pitch module 216 to obtain a number of caller interaction points associated with changes in the volume of a caller during a call session. In other exemplary embodiments, the processing module 210 may access the language module 218 to obtain a number of caller interaction points associated with language used by a caller during a call session. The processing module 210 may continuously or intermittently access the various modules to obtain caller interaction points.

In another exemplary embodiment, various modules may provide updates to the processing module 210. For example, the misrecognition module 214 may provide a number of caller interaction points associated with misrecognitions by the interactive modules 102b during a call session to the processing module 210. In another exemplary embodiment, the caller tone/pitch module 216 may provide a number of caller interaction points associated with changes in the volume of a caller during a call session to the processing module 210. In other exemplary embodiments, the language module 218 may provide a number of caller interaction points associated with language used by a caller during a call session to the processing module 210. The various modules may continuously or intermittently providing updated caller interaction points to the processing module 210.

The processing module 210 may determine caller interactions based at least in part on information obtained from various modules. For example, the processing module 210 may sum the number of caller interaction points from various modules. In an exemplary embodiment, the processing module 210 may add the number of caller interaction points obtained from the misrecognition module 214, the number of caller interaction points obtained from the caller tone/pitch module 216, and the number of caller interaction points obtained from the language module 218. The processing module 210 may compare the total number of caller interaction points from various modules (e.g., the misrecognition module 214, caller tone/pitch module 216, and/or language module 218) with the caller interaction threshold associated with a caller of a call session. In an exemplary embodiment, when the total number of caller interaction points from various modules may be below the caller interaction threshold associated with a caller, the processing module 210 may continue to monitor the caller interaction with the automated voice portal system 102 during a call session. In another exemplary embodiment, when the total number of caller interaction points from various modules may exceed the caller interaction threshold, the processing module 210 may perform one or more actions. For example, one or more actions performed by the processing module 210 may include prompt the caller to a live agent, providing an option for the caller to transfer to a live agent, or directly transfer the caller to a live agent, or other desired actions to relieve agitation or frustration of the caller during a call session.

The database module 212 may store and manage data received during a call session. The database module 212 may provide an interface, e.g., a uniform interface, for other modules within the caller interaction measurement system 108 and may write, read, and search for messages stored in one or more repositories or databases. The database module 212 may also perform other functions, such as, but not limited to, concurrent access, backup and archive functions. Due to limited amount of storing space the database module 212 may compress, store, transfer or discard the data received during a call session stored within, after a period of time, e.g., a month. The database module 212 may store the data received during a call session from the input module 208. The database module 212 may also provide data received during a call session to the other modules of the caller interaction measurement system 108. In another exemplary embodiment, the database module 212 may store data received from other modules (e.g., the presentation module 206, the processing module 210, the misrecognition module 214, the caller tone/pitch module 216, and/or the language module 218) of the caller experience measurement system 108.

The database module 212 may be network accessible storage and may be local, remote, or a combination thereof to modules 206, 208, 210, 214, 216, 218, and 220. The database module 212 may utilize a flash memory, a redundant array of inexpensive disks (RAID), tape, disk, a storage area network (SAN), an internee small computer systems interface (iSCSI) SAN, a Fibre Channel SAN, a common Internet File System (CIFS), network attached storage (NAS), a network file system (NFS), or other computer accessible storage.

Figure 3:
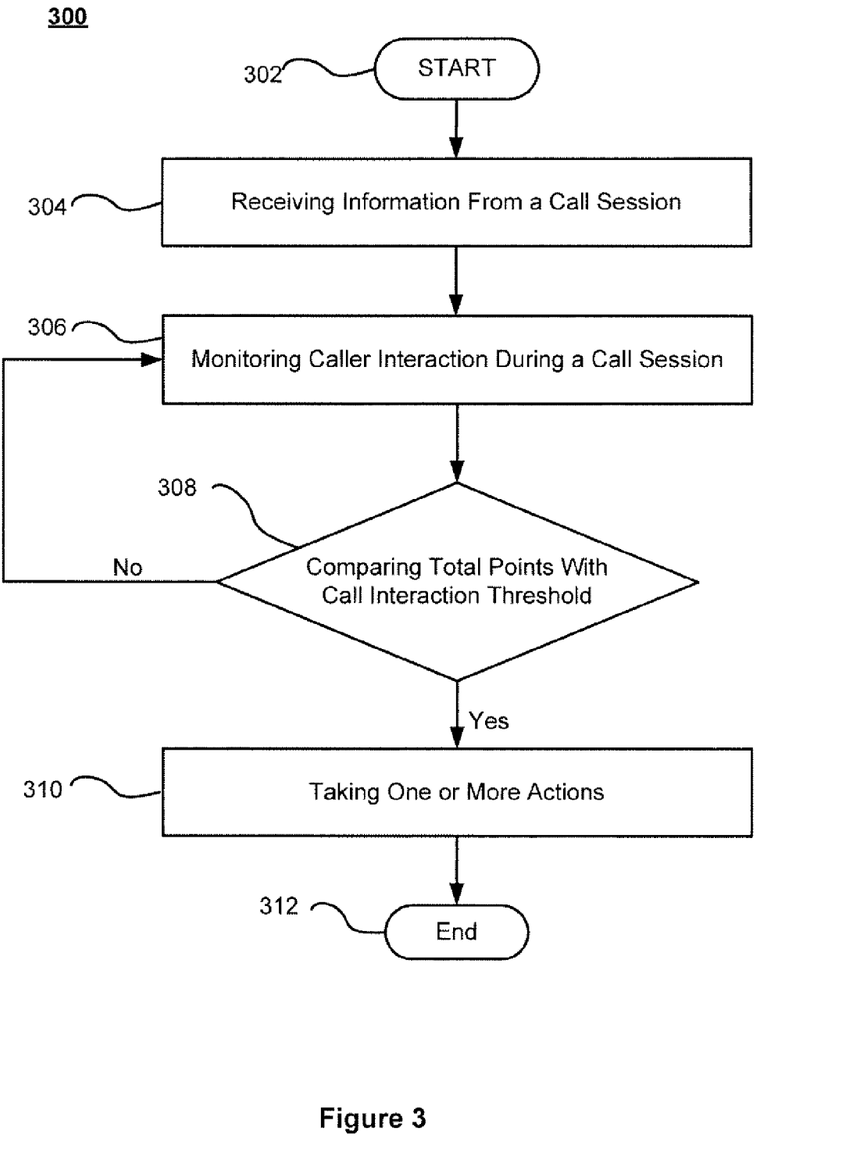
FIG. 3 is a flowchart illustrating the functionality for monitoring caller interactions during a call session according to a particular embodiment.

FIG. 3 is a flowchart illustrating the functionality for monitoring caller interactions during a call session according to a particular embodiment. This exemplary method 300 may be provided by way of example, as there are a variety of ways to carry out the method. The method 300 shown in FIG. 3 can be executed or otherwise performed by one or a combination of various systems. The method 300 is described below may be carried out by the system and network shown in FIGS. 1 and 2, by way of example, and various elements of the system and network are referenced in explaining the example method of FIG. 3. Each block shown in FIG. 3 represents one or more processes, methods or subroutines carried out in exemplary method 300. Referring to FIG. 3, exemplary method 300 may begin at block 302.

At block 302, the method 300 for monitoring caller interactions during a call session may begin.

At block 304, the caller interaction measurement system 108 may receive information from a call session. For example, a caller associated with one of a plurality of caller stations 106(1-N) may establish a call session with an automated voice portal system 102 via a communication network 104. The caller interaction measurement system 108 may receive information or data from a call session via the communication network 104. The caller interaction measurement system 108 may preprocess the information or data received from a call session. For example, the caller interaction measurement system 108 may filter or format the information or data received from a call session. The caller interaction measurement system 108 may store the processed information or data received from a call session. After receiving the information or data received from a call session, the method 300 may proceed to block 306.

At block 306, the caller interaction measurement system 108 may monitor caller interactions during the call session. For example, the caller interaction measurement system 108 may monitor caller interactions during the call session based at least in part on information received from the call session. In an exemplary embodiment, the caller interaction measurement system 108 may monitor a rate of misrecognition by the automated voice portal system 102. In another exemplary embodiment, the caller interaction measurement system 108 may monitor speech of a caller with the automated voice portal system 102. In other exemplary embodiments, the caller interaction measurement system 108 may monitor caller interactions with the automated voice portal system 102 based at least in part on language used by a caller during the call session.

The caller interaction measurement system 108 may record and store a number of positive caller interaction points for misrecognitions associated with each of the plurality of interactive modules 102b of the automated voice portal system 102 during a call session. The caller interaction measurement system 108 may record and store a number of negative caller interaction point for good recognition associated with each of the plurality of interactive modules 102b of the automated voice portal system 102 during a call session. In another exemplary embodiment, the caller interaction measurement system 108 may record and store a number of caller interaction points for changes in the volume of the caller during a call session. In other exemplary embodiments, the caller interaction measurement system 108 may record and store a number of caller interaction points for derogatory languages used by a caller during a call session. After monitoring caller interaction during a call session, the method 300 may proceed to block 308.

At block 308, the caller interaction measurement system 108 may compare a total number of caller interaction points accumulated during a call session with a caller interaction threshold. In an exemplary embodiment, the caller interaction measurement system 108 may determine a caller interaction threshold based at least in part on previous call sessions with the automated voice portal system 102. In an exemplary embodiment, the caller interaction measurement system 108 may determined that the caller interaction threshold for a caller is 200 caller interaction points. Also, the caller interaction measurement system 108 may determine caller interactions points (x) for one unit of frustration during a call session. In an exemplary embodiment, the caller interaction measurement system 108 may determine that one unit of frustration is 300 caller interaction points.

The caller interaction measurement system 108 may determine total number of caller interaction points associated with a call session. In an exemplary embodiment, during a call session, a good recognition with a easy group of interactive modules 102b (e.g., -x/6) may have negative 50 caller interaction points (e.g., 300/6). A misrecognition with a moderate group of interactive modules 102b (e.g., x/4) may have positive 75 caller interaction points (e.g., 300/4). A good recognition of a difficult group of interactive modules 102b (e.g., -x/2) may have negative 150 caller interaction points (e.g., -300/2). A misrecognition of a difficult group of interactive modules 102b (e.g., x/6) may have a positive 50 caller interaction points (e.g., 300/6). The caller may raise the volume of the speech by 5 decibels (e.g., x/2) may have a positive 150 caller interaction points. The caller interaction measurement system 108 may determine that a caller used derogatory language with a confidence level of 90% (e.g., 2x/3) having 200 caller interaction points. The caller interaction measurement system 108 may determines that the total number of caller interaction points for the call session to be 275 caller interaction points. The caller interaction measurement system 108 may compare a total number of caller interaction points (e.g., 275) with the caller interaction threshold (e.g., 200). In the event that the total number of caller interaction points for the call session exceeds the caller interaction threshold, the method 300 may proceed to block 310. In the event that the total number of caller interaction points for the call session does not exceed the caller interaction threshold, the method 300 may proceed back to block 306.

At block 310, the caller interaction measurement system 108 may take one or more actions. For example, the caller interaction measurement system 108 may prompt the caller to a live agent, providing an option for the caller to transfer to a live agent, or directly transfer the caller to a live agent, or other desired actions to relieve agitation or frustration of the caller during a call session. After taking one or more actions, the method 300 may proceed to block 312.

At block 312, the method 300 may end.

Figure 4:
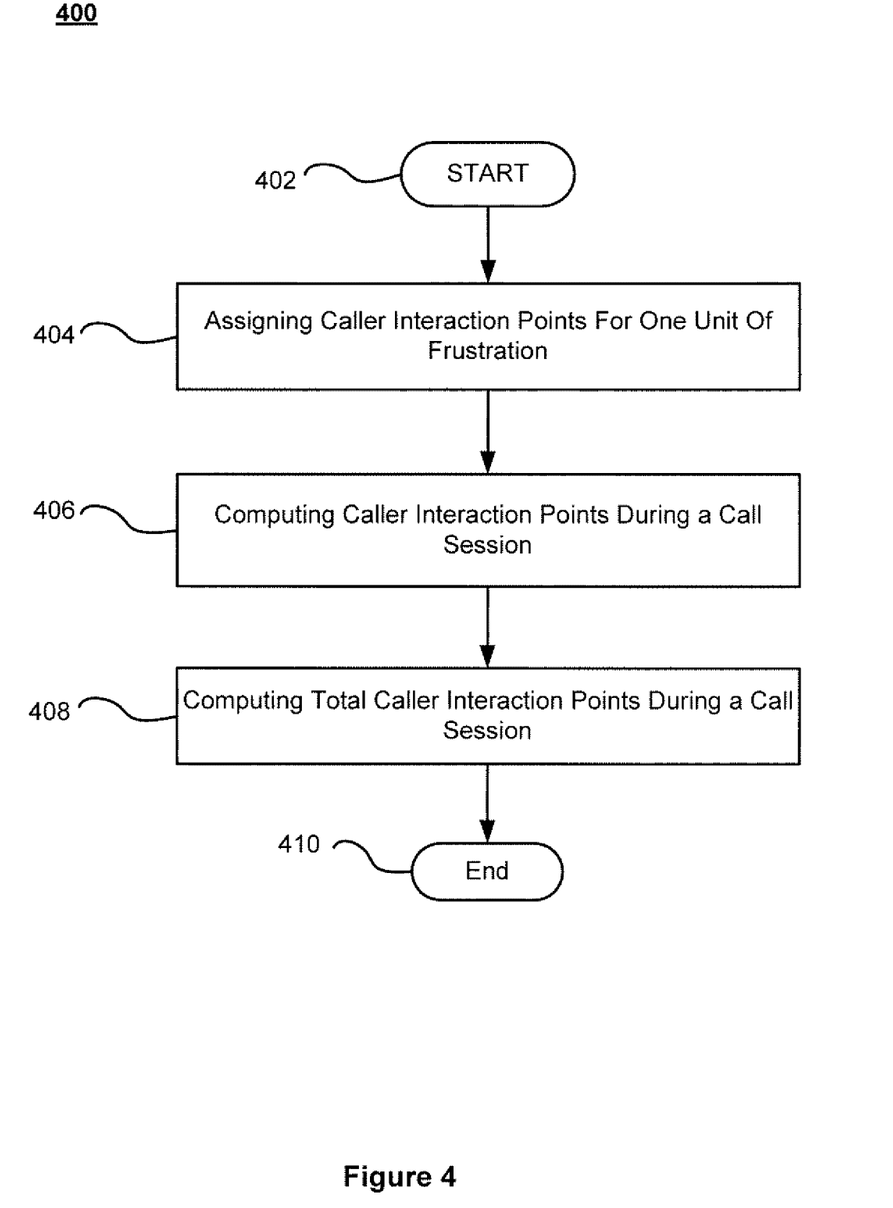
FIG. 4 is a flowchart illustrating the functionality for computing caller interaction points during a call session according to a particular embodiment.

FIG. 4 is a flowchart illustrating the functionality for computing caller interactions points during a call session according to a particular embodiment. This exemplary method 400 may be provided by way of example, as there are a variety of ways to carry out the method. The method 400 shown in FIG. 4 can be executed or otherwise performed by one or a combination of various systems. The method 400 is described below may be carried out by the system and network shown in FIGS. 1 and 2, by way of example, and various elements of the system and network are referenced in explaining the example method of FIG. 4. Each block shown in FIG. 4 represents one or more processes, methods or subroutines carried out in exemplary method 400. Referring to FIG. 4, exemplary method 400 may begin at block 402.

At block 402, the method 400 for computing caller interaction points during a call session may begin.

At block 404, the caller interaction measurement system 108 may assign caller interaction points (x) for one unit of frustration during a call session. In an exemplary embodiment, the historical data module 220 of the caller interaction measurement system 108 may assign x=300 caller interaction points for one unit of frustration. For example, the historical data module 220 may automatically assign caller interaction points (e.g., 300 caller interaction points) for one unit of frustration during a call session. For example, the historical data module 220 may assign default or predetermined caller interaction points (e.g., 300 caller interaction points) for one unit of frustration during a call session. In other exemplary embodiments, the historical data module 220 may assign call interaction points (e.g., 300 caller interaction points) for one unit of frustration to a previous caller based at least in part on the previous caller's comfort level with the automated voice portal system 102. In another exemplary embodiment, the presentation module 206 of the caller interaction measurement system 108 may receive a request from users (e.g., administrator) associated with the caller interaction measurement system 108 to assign caller interaction points (e.g., 300 caller interaction points) for one unit of frustration. For example, the request may include caller interaction points (e.g., 300 caller interaction points) inputted by the user for one unit of frustration during a call session. After assigning caller interaction points for one unit of frustration, the method 400 may proceed to block 406.

At block 406, the caller interaction measurement system 108 may compute caller interaction points during the call session. For example, the misrecognition module 214 of the caller interaction measurement system 108 may compute caller interaction points based at least in part on a number of misrecognitions by the automated voice portal system 102. For example, the misrecognition module 214 may identify which group (e.g., easy group, moderate group, or difficult group) the interactive modules 102b may belong to. Also, the misrecognition module 214 may compute the caller interaction points for good recognitions and misrecognitions based on assigned caller interaction points (e.g., $\pm x/6$, $\pm x/4$, $\pm x/2$) for different groups of interactive modules 102b. In an exemplary embodiment, during a call session, a good recognition with a easy group of interactive modules 102b (e.g., $-x/6$) may have negative 50 caller interaction points (e.g., $-300$ caller interaction points/6=$-50$ caller interaction points). A misrecognition with a moderate group of interactive modules 102b (e.g., x/4) may have positive 75 caller interaction points (e.g., 300 caller interaction points/4=75 caller interaction points). A good recognition of a difficult group of interactive modules 102b (e.g., $-x/2$) may have negative 150 caller interaction points (e.g., $-300$ caller interaction points/2=$-150$ caller interaction points). A misrecognition of a difficult group of interactive modules 102b (e.g., x/6) may have a positive 50 caller interaction points (e.g., 300 caller interaction points/6=50 caller interaction points).

In another exemplary embodiment, the caller tone/pitch module 216 of the caller interaction measurement system 108 may compute caller interaction points based at least in part on the changes with caller's tone/pitch during a call session. For example, the caller tone/pitch module 216 may determine a level (e.g., first level, second level, or third level) of change in the caller's tone/pitch during a call session. Also, the caller tone/pitch module 216 may compute the caller interaction points (e.g., x/3, x/2, or x) based at least in part on levels of change in the caller's tone or more pitch during a call session. In exemplary embodiment, the caller may raise the volume of the speech by 5 decibels (e.g., x/2) may have a positive 150 caller interaction points (e.g., 300 caller interaction points/2=150 caller interaction points).

In other exemplary embodiments, the language module 218 of the caller interaction measurement system 108 may compute caller interaction points base at least in part on language used by a caller during a call session. For example, the language module 218 may compute caller interaction points based at least in part on a confidence level the language module 218 may match a response to a predetermined set of grammars associated with derogatory language. In another exemplary embodiment, the language module 218 may compute caller interaction points based at least in part on a type of derogatory language used by a caller during a call session. In an exemplary embodiment, the language module 218 may determine that a caller used derogatory language with a confidence level of 90% (e.g., 2x/3) having 200 caller interaction points (e.g., 2x300 caller interaction points/3=200 caller interaction points). After computing caller interaction points during a call session, the method 400 may proceed to block 408.

At block 408, the caller interaction measurement system 108 may compute a total number of caller interaction points accumulated during a call session. In an exemplary embodiment, the processor module 210 of the caller interaction measurement system 108 may compute a total number of caller interaction points based at least in part on good recognitions and misrecognitions by interactive modules 102b, changes in caller's tone/pitch, and language used by a caller during a call session. For example, the processor module 210 may periodically or continuously access the misrecognition module 214, the caller tone/pitch module 216, and the language module 218 to obtain caller interaction points computed by each module. Also, the processor module 210 may receive updates of caller interaction points computed by the misrecognition module 214, the caller tone/pitch module 216, and the language module 218. The processing module 210 may add the caller interaction points associated with good recognitions and misrecognitions by interactive modules 102b (e.g., $-75$ caller interaction points) computed by the misrecognition module 214, caller interaction points associated with levels of change in caller's tone/pitch (e.g., 150 caller interaction points) computed by the caller tone/pitch module 216, and the caller interaction points associated with language used by a caller during a call session (e.g., 200 caller interaction points) computed by the language module 218. After computing the total caller interaction points during a call session, the method 400 may proceed to block 410.

At block 410, the method 400 may end.

The description above describes a voice portal system, a communication network, a plurality of caller stations, a caller interaction measurement system having network elements, storage devices, various networks, and other elements for coupling user via the communication network, some of which are explicitly depicted, others of which are not. As used herein, the term "module" may be understood to refer to executable software embodied on a non-transitory medium, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A method, comprising:
receiving, via an input module, information from a call session between a caller and an automated voice portal system via a communication network;
monitoring caller interaction points accumulated during the call session, wherein the caller interaction points are associated with at least one call session determination, the at least one call session determination selected from: a misrecognition determination, a caller tone determination, a caller pitch determination, and a language determination;
comparing, via a processing module, a real-time sum of the caller interaction points accumulated during the call session with the automated voice portal system with a caller interaction point threshold, wherein the caller interaction point threshold is based on the caller interaction points associated with specific to the caller and at least one of: historical data associated with the caller and an interaction threshold associated with a similar caller; and
taking, via the processing module, one or more actions in response to the sum of the caller interaction points exceeding the caller interaction threshold.

2. The method of claim 1, further comprising preprocessing the information from the call session.

3. The method of claim 1, further comprising monitoring a number of misrecognitions by the automated voice portal system.

4. The method of claim 1, further comprising categorizing a plurality of interactive modules associated with the misrecognition determination into a plurality of groups of interactive modules.

5. The method of claim 4, wherein categorizing a plurality of interactive modules is based at least in part on a rate of misrecognitions associated with each of the plurality of interactive modules.

6. The method of claim 4, further comprising assigning different caller interaction points for misrecognitions for each of the plurality of groups of interaction modules.

7. The method of claim 4, further comprising assigning different caller interaction points for good recognitions for each of the plurality of groups of interaction modules.

8. The method of claim 1, further comprising monitoring, in the caller tone determination and caller pitch determination, a change in volume of the caller's speech during the call session.

9. The method of claim 8, wherein monitoring a change in volume of the caller's speech further comprises assigning different caller interaction points for different levels of changes in the volume of the caller's speech during the call session.

10. The method of claim 1, further comprising monitoring, in the language module, derogatory language used by the caller during the call session.

11. The method of claim 10, wherein monitoring derogatory language further comprises assigning different caller interaction points for different derogatory language used by the caller during the call session.

12. The method of claim 1, further comprising updating the caller interaction threshold of the caller based at least in part on the call session and a previous call session of the caller with the automated voice portal system.

13. A system, comprising:
an input module configured to receive information from a call session between a caller and an automated voice portal system via a communication network; and
a processing module configured to compare a sum of caller interaction points with the automated voice portal system with a caller interaction threshold and take one or more actions in response to the sum of the caller interaction points exceeding the caller interaction threshold,
wherein the caller interaction points are associated with at least one experience module, the at least one experience module selected from: a misrecognition module, a caller tone and pitch module, and a language module, and
wherein the caller interaction threshold is based on the caller interaction points associated with the caller and at least one of: historical data associated with the caller and an interaction threshold associated with a similar caller.

14. The system of claim 13, further comprises a database module configured to store the information from the call session.

15. The system of claim 13, wherein the misrecognition module is configured to monitor caller interaction points for misrecognitions by the automated voice portal system.

16. The system of claim 15, wherein the misrecognition module is further configured to categorize a plurality of interactive modules of the automated voice portal system into a plurality of groups of interactive modules.

17. The system of claim 16, wherein the misrecognition module is configured to categorize the plurality of interactive modules based at least in part on a rate of misrecognitions associated with each of the plurality of interactive modules.

18. The system of claim 16, wherein the misrecognition module is further configured to assign different caller interaction points for misrecognitions for each of the plurality of groups of interaction modules.

19. The system of claim 16, wherein the misrecognition module is further configured to assign different caller interaction points for good recognitions for each of the plurality of groups of interaction modules.

20. The system of claim 13, wherein the caller tone and pitch module is configured to monitor a change in volume of the caller's speech during the call session.

21. The system of claim 20, wherein the caller tone and pitch module is further configured to assign different caller interaction points for different levels of changes in the volume of the caller's speech during the call session.

22. The system of claim 13, wherein the language module is configured to monitor derogatory language used by the caller during the call session.

23. The system of claim 22, wherein the language module is further configured to assign different caller interaction points for different derogatory language used by the caller during the call session.

24. The system of claim 13, further comprising a historical data module configured to determine a caller interaction threshold of the caller based at least in part on a previous call session of the caller with the automated voice portal system.

25. The method of claim 1, wherein, when the caller is associated with at least one previous stored caller interaction, the caller interaction threshold is based on the caller interaction points associated with the caller and historical data associated with the caller, and
wherein, when the caller is a new caller, the caller interaction threshold is based on the caller interaction points associated with the caller and at least one of: an interaction threshold associated with a similar caller and an average caller threshold.

26. The method of claim 1, wherein the threshold is increased when at least one call session determination indicates caller frustration.

27. The method of claim 26, wherein caller frustration comprises at least one of: a caller tone determination indicating a higher caller volume, a caller pitch determination indicating a higher caller volume, and a language determination indicating defamatory language.

28. The method of claim 1, wherein the threshold is decreased when at least one call session determination indicates caller patience.

29. The method of claim 28, wherein caller patience is at least one of:
  providing multiple repeated responses after one or more misrecognition determinations, a caller tone determination indicating minimal change in caller volume, a caller pitch determination indicating minimal change in caller volume.

30. The method of claim 1, wherein the caller interaction point threshold is further based on an interaction threshold based on an average caller threshold.

31. The system of claim 13, wherein the caller interaction point threshold is further based on an interaction threshold based on an average caller threshold.

\* \* \* \* \*